(12) United States Patent
Mercat et al.

(10) Patent No.: US 9,599,526 B2
(45) Date of Patent: Mar. 21, 2017

(54) TORQUE-MEASURING HUB, POWER-MEASURING SYSTEM, CYCLE WHEEL EQUIPPED WITH SUCH A HUB OR SYSTEM, AND MEASURING METHOD USING SUCH A HUB

(71) Applicant: MAVIC S.A.S., Metz-Tessy (FR)

(72) Inventors: Jean-Pierre Mercat, Chavanod (FR); Christophe Neyroud, Cran-Gevrier (FR)

(73) Assignee: MAVIC S.A.S., Metz-Tessy (FR)

( * ) Notice: Subject to any disclaimer, the term of this patent is extended or adjusted under 35 U.S.C. 154(b) by 341 days.

(21) Appl. No.: 14/157,133

(22) Filed: Jan. 16, 2014

(65) Prior Publication Data

US 2014/0202262 A1   Jul. 24, 2014

(30) Foreign Application Priority Data

Jan. 18, 2013   (FR) ...................................... 13 00114

(51) Int. Cl.

| G01L 3/00 | (2006.01) |
|---|---|
| G01L 3/24 | (2006.01) |
| G01L 3/10 | (2006.01) |
| B60B 27/00 | (2006.01) |
| G01L 3/14 | (2006.01) |
| B60B 27/02 | (2006.01) |

(52) U.S. Cl.
CPC .......... *G01L 3/108* (2013.01); *B60B 27/0068* (2013.01); *B60B 27/023* (2013.01); *G01L 3/1457* (2013.01); *B62K 2207/00* (2013.01)

(58) Field of Classification Search
CPC .................................... G01L 3/24; G01L 3/00
USPC ..................................................... 73/862.338
See application file for complete search history.

(56) References Cited

U.S. PATENT DOCUMENTS

| 5,018,392 | A | 5/1991 | Mercat |
| 6,418,797 | B1 | 7/2002 | Ambrosina et al. |
| 8,677,837 | B2 | 3/2014 | Mercat et al. |
| 2005/0275561 | A1* | 12/2005 | Kolda ................. B60B 27/0068 340/870.07 |
| 2012/0234108 | A1 | 9/2012 | Janecek et al. |
| 2012/0304783 | A1* | 12/2012 | Kitamura .............. B60B 27/023 73/862.49 |

FOREIGN PATENT DOCUMENTS

| EP | 0 841 549 A1 | 5/1998 |
| EP | 1 082 592 B1 | 11/2005 |
| EP | 2 529 950 A1 | 12/2012 |

* cited by examiner

*Primary Examiner* — Lisa Caputo
*Assistant Examiner* — Jamel Williams
(74) *Attorney, Agent, or Firm* — Greenblum Bernstein, P.L.C.

(57) ABSTRACT

A hub for measuring the driving torque of a cycle wheel, the hub including a central shaft defining an axis of rotation of the wheel, and a hub body mounted to rotate freely about the shaft, the hub body including a central portion bordered on both sides by respective flanges, the flanges fastening at least one connecting element to connect the hub body to a rim of the wheel. The hub includes a system for measuring the driving torque of the wheel including strain gauges fixed on the hub body.

21 Claims, 8 Drawing Sheets

TORQUE-MEASURING HUB, POWER-MEASURING SYSTEM, CYCLE WHEEL EQUIPPED WITH SUCH A HUB OR SYSTEM, AND MEASURING METHOD USING SUCH A HUB

CROSS-REFERENCE TO RELATED APPLICATION

This application is based upon French Patent Application No. 13/00114, filed Jan. 18, 2013, the disclosure of which is hereby incorporated by reference thereto in its entirety, and the priority of which is claimed under 35 U.S.C. §119.

BACKGROUND

1. Field of the Invention

The invention relates to a hub for measuring the torque of a cycle wheel, as well as a cycle wheel equipped with such a torque-measuring hub. The present invention also relates to a system for measuring the power of a cycle wheel, as well as a cycle wheel equipped with such a system. Finally, the invention relates to a method for measuring, using such a hub or such a system.

2. Background Information

Measuring the torque and driving power of a cycle wheel is of interest in a number of cases, for example in evaluating the performance of a cyclist during practice. The power generated by the cyclist can be determined by multiplying the cycle speed by the driving force, transmitted by the cyclist to the drive wheel. However, measuring this force is relatively complex and, in the context of the present invention, the power is determined by multiplying the driving torque, transmitted by the cyclist to the drive wheel, by the angular velocity of the wheel.

The patent document EP-0 841 549-A1 discloses a hub for measuring the power of a wheel cycle. This hub is equipped with two systems for measuring its angular position, each comprising a cam provided with teeth spaced apart angularly at regular intervals. Two switches are each provided with a metal blade in engagement with the teeth of one of the cams. The driving torque transmitted by the cyclist to the wheel is determined by comparing the time offset between the measurements of the switches. To calculate the power, the driving torque is multiplied by the angular velocity of the wheel, determined by means of the switches. Such a measuring system incorporates a large number of moving parts, which makes it relatively expensive and complicated to manufacture, and causes measurement inaccuracies.

The patent document EP-1 082 592-A1 and family member U.S. Pat. No. 6,418,797-B1 disclose a two-part hub for measuring the power of a wheel cycle. A driving part of the hub, rotationally movable about a fixed axis of the wheel, is rotationally driven by the cyclist who pedals via a freewheel device. The driving part is housed within a driven part of the hub. The driving and driven parts are radially separated by ball bearings. A connecting element supporting strain gauges is fixed to both the driving part and the driven part of the hub. Thus, when in use, the connecting element transmits the driving torque generated by the cyclist to the driven part, and the connecting element strains. The strain of the connecting element is measured by the strain gauge and makes it possible to obtain a measurement of the driving torque generated by the cyclist. Furthermore, a sensor measures the angular velocity of the drive wheel, which makes it possible to obtain a measurement of the power developed by the cyclist, by multiplying the driving torque by the angular velocity. Such a device is heavy and bulky, as it requires the presence of two concentric hub portions mutually isolated in rotation by a large ball bearing weighing down the system or, in another embodiment, by a thermoplastic bearing generating friction and hysteresis in the torque measurement, significantly degrading the measurement accuracy. This device also requires a relatively massive connecting element forming the test body supporting the strain gauges. Furthermore, the various gauges are glued to various locations of the connecting element and they must be connected to one another by wires that are also glued to the connecting element. The fixing of separate components to the connecting element poses problems that affect manufacturing quality and electronic reliability.

SUMMARY

The invention overcomes the aforementioned drawbacks by providing a lightweight and compact hub for measuring the power of a cycle wheel. The invention also provides a high quality hub, with improved reliability at reasonable cost.

To this end, the invention relates to a hub for measuring the driving torque of a cycle wheel, which includes:
 a central shaft defining an axis of rotation of the wheel;
 a hub body mounted to rotate freely about the shaft.

The hub body comprises a central portion bordered on both sides by zones for anchoring devices for fixing at least one connecting element connecting the hub body to a rim of the wheel.

According to the invention, the hub includes a system for measuring the driving torque of the wheel, such system including strain gauges attached to the hub body.

Advantageously, the strain gauges are located on the central portion of the hub body, between the two zones for anchoring the device for fixing the connecting elements which connect the hub body to the rim.

Advantageously, the hub is mainly unitary, meaning that at least the anchoring zone located on the side opposite the freewheel is made of a single piece with the central portion of the hub body.

By means of the invention, the measurement of the driving torque of the wheel is obtained using strain gauges attached directly to the hub body, which is mainly unitary. Thus, the hub does not include moving parts or additional parts specifically dedicated to the installation of the strain gauges. The hub according to the invention is lightweight, inexpensive to manufacture, and produces reliable measurements with negligible hysteresis.

According to advantageous but not essential aspects of the invention, such a power-measuring hub can incorporate one or more of the following characteristics, taken in any technically feasible combination:
 the strain gauges are fixed to the central portion of the hub body;
 the central portion of the hub body has a generally symmetrical transverse cross-section with respect to two longitudinal perpendicular planes. Thus, the strain gauge bridge measurement is independent of the bending moments and the normal force;
 at least two strain gauges are angularly offset by 180° in relation to the axis;
 the central portion of the hub body has a generally rectangular transverse cross section;
 the two strain gauges are attached to the small sized surfaces of the central portion of the hub body;

the hub comprises a tubular protective element arranged between the flanges, around the central portion of the hub body, and demarcating a volume for receiving the measuring system;

the central portion of the hub body is hollow and demarcates a volume for receiving the measuring system;

the strain gauges are attached to the inner surface of the central portion of the hub body;

the hub body comprises no movable portion;

the connecting elements connecting the hub body to the rim are spokes, whose distance from the axis of the wheel is such that the ratio of the distance from the axis of the spokes of the set on the freewheel side to the distance from the axis of the spokes of the set opposite the freewheel is less than 65%.

The invention also relates to a system for measuring the driving power of a cycle wheel that includes such a torque-measuring hub equipped with a member for measuring the angular velocity of the hub body in relation to the central shaft.

The invention also relates to a cycle wheel that includes such a hub or system for measuring power.

The invention also relates to a measuring method using such a hub or such a system that includes a calibration step prior to using the cycle, in which a series of tests are performed using a torque generator driving the hub, the rim being immobilized, so as to obtain a relationship between the output signals of the strain gauges and the driving torque of the wheel.

According to advantageous but not essential aspects of the invention, such a method may incorporate one or more of the following characteristics, taken in any technically feasible combination:

during calibration, the hub is assembled to the rim and an inflated tire is mounted on the rim;

the hub is equipped with a temperature sensor and, during calibration, a series of tests are conducted to establish a relationship between the temperature variations and the strain gauge bridge measurement in order to correct the law determining the driving torque of the wheel as a function of the electric signal from the strain gauge bridge, but also the temperature.

BRIEF DESCRIPTION OF DRAWINGS

The invention will be better understood in light of the following description of a power-measuring hub according to the invention, given solely by way of example, and with reference to the annexed drawings, in which.

DETAILED DESCRIPTION

Figure 1:
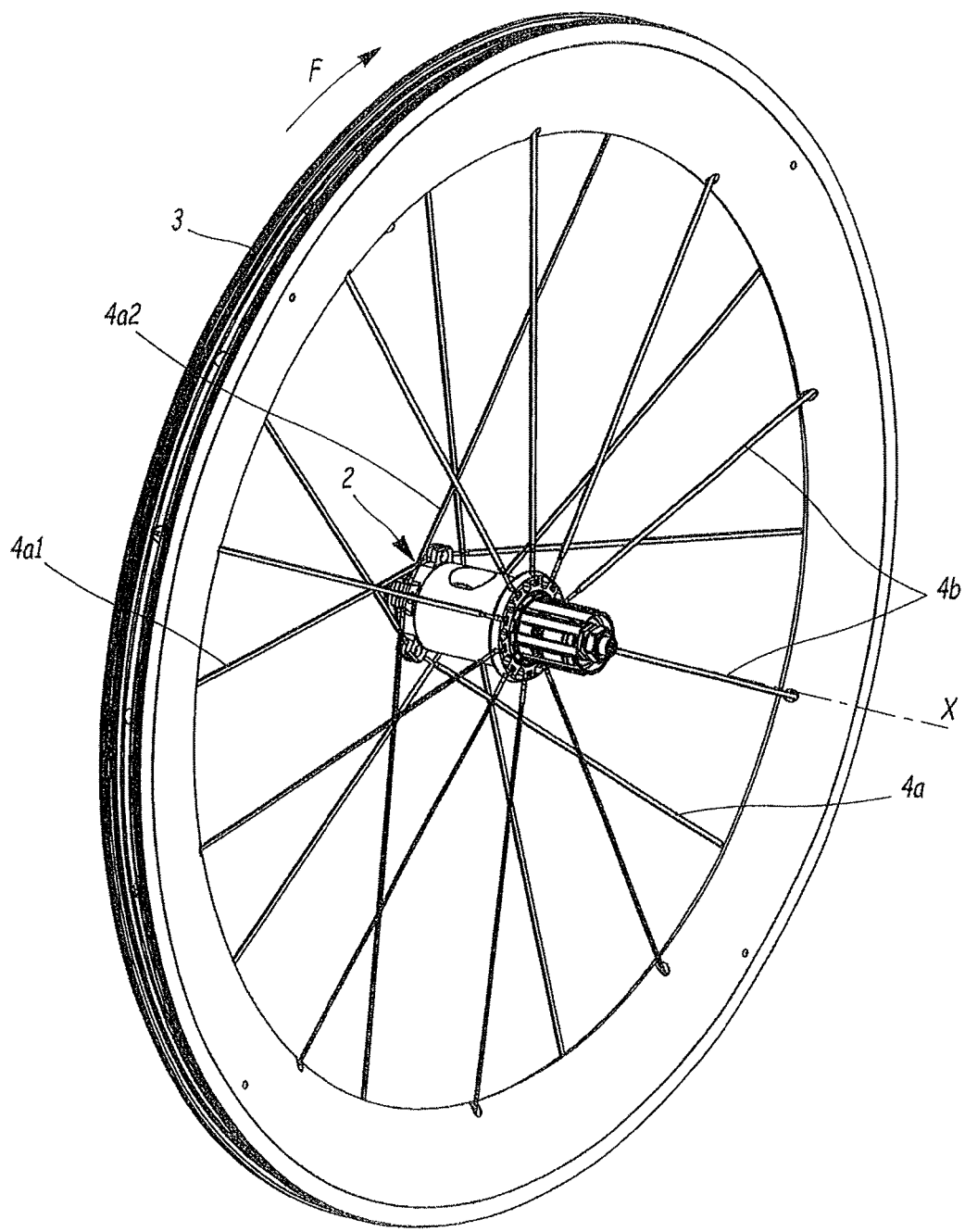
FIG. 1 is a perspective view of a cycle wheel according to the invention.

The torque-measuring hub 2 shown in FIGS. 1-6 is part of a bicycle rear wheel 1 shown without its tire in FIG. 1. When pedaling in the forward direction, the cyclist rotationally drives the wheel 1 about an axis of rotation X in a direction shown by the arrows F.

The wheel 1 comprises means for connecting the hub 2 to a rim 3, for example two spoke sets 4a and 4b. The spoke set 4b is referred to as the "spoke set on the side of the freewheel", while the spoke set 4a is referred to as the "spoke set on the side opposite the freewheel". The set 4a comprises non-driving or pushing spokes 4a2, which tend to relax when the cyclist pedals, as well as driving spokes 4a1, which tend to tighten and pull on the rim 3 when the cyclist pedals in order to transmit a driving torque.

The spokes 4a1 and 4a2 of the set 4a opposite the freewheel are mounted crosswise. Each driving spoke 4a1 thus crosses a non-driving spoke 4a2 only once. In a plane perpendicular to the axis X, the spokes 4a1 and 4a2 form a non-zero angle with a purely radial direction. The direction of the spokes 4a1 and 4a2 thus comprises a tangential component.

The spokes of the set 4b on the side of the freewheel are oriented along a radial direction.

The spokes 4a1 and 4a2 of the set 4a opposite the freewheel and the spokes of the set 4b on the side of the freewheel are slightly inclined in relation to a plane perpendicular to the axis X, given the distance along the axis X between the zones for fixing the spoke sets 4a and 4b on the hub 2.

The orientation angle (umbrella angle or dish angle) of the set 4a on the side of the freewheel is smaller than that of the set opposite the freewheel.

The orientation of the spokes 4a1 and 4a2 provides the set 4a on the side opposite the freewheel with a greater torsional rigidity compared to the set 4b on the side of the freewheel.

Figure 2:
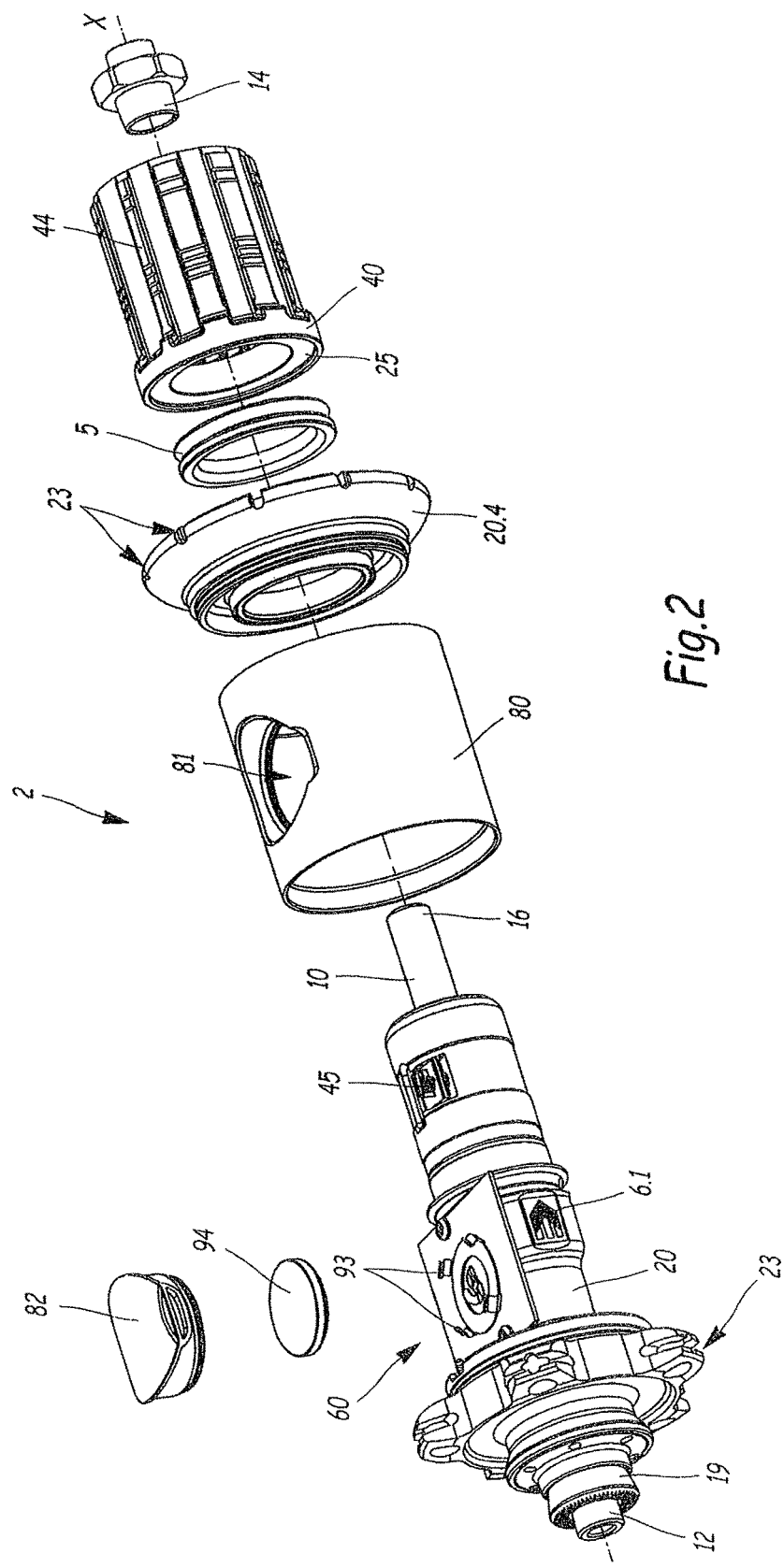
FIG. 2 is an exploded perspective view of a torque-measuring hub according to the invention, integral with the cycle wheel of FIG. 1.
Figure 3:
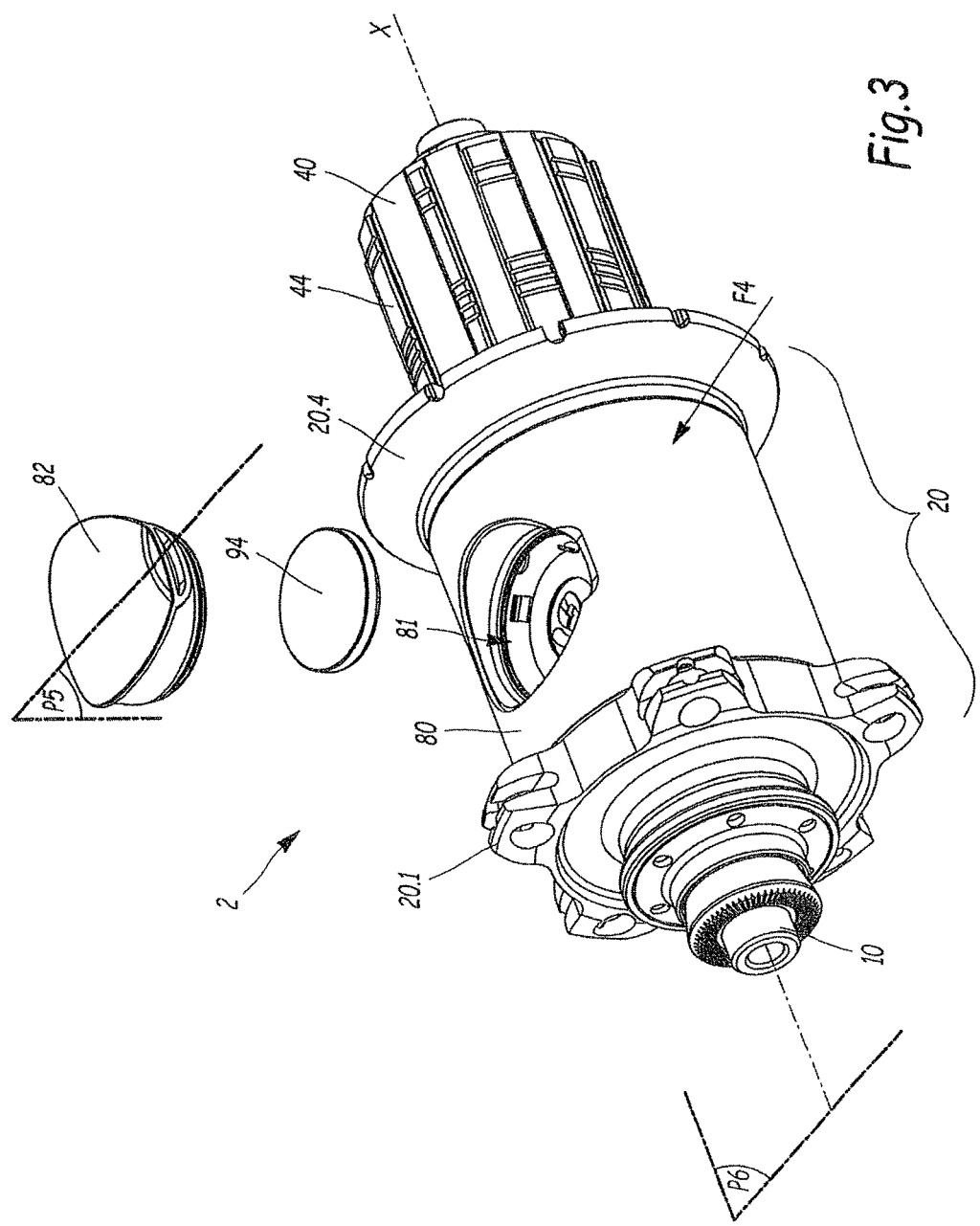
FIG. 3 is a partially exploded perspective view of the hub of FIG. 2.
Figure 6:
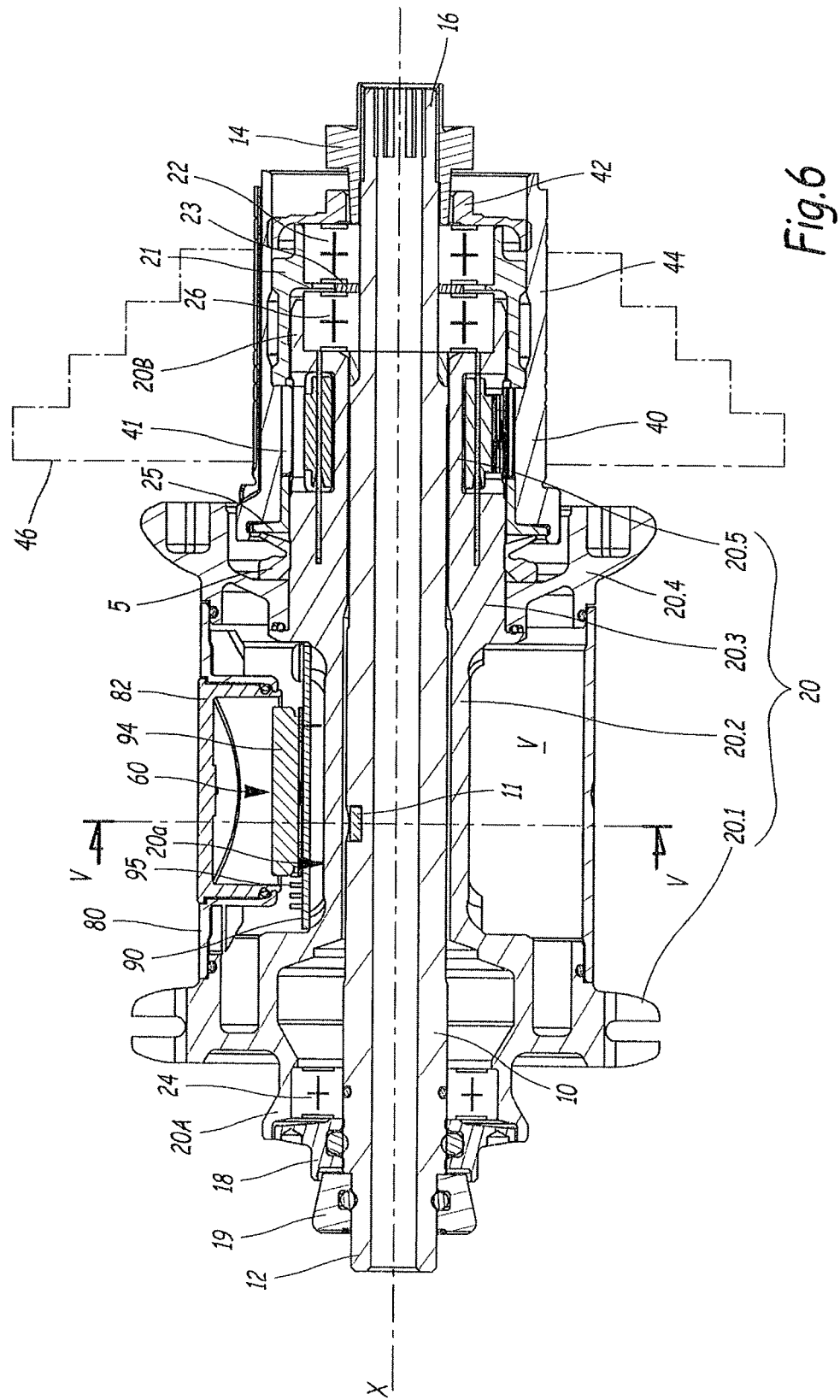
FIG. 6 is a longitudinal cross-section along the plane P6 of FIG. 3.

The hub 2 includes a hollow shaft 10 extending longitudinally along the axis X, as shown, e.g., in FIGS. 2, 3, and 6. The shaft 10 carries an end-piece 19 in the area of a first end 12. The shaft 10 carries a nut 14 in the area of its second threaded end 16 opposite the end 12. The nut 14 and the end-piece 19 enables the assembly of the hub 2 and the wheel 1 to be mounted on the frame of a bicycle (not shown) by means of a quick release skewer (not shown) extending through the hollow shaft 10.

Hereinafter, the terms "axial" and "radial" and their derivatives are defined with reference to the axis X. An axial direction is parallel to the axis X, whereas a radial direction is perpendicular and secant to this axis.

A hub body 20 is mounted about the shaft 10, with possibility of rotation with respect to the shaft 10 about the axis X. Two ball bearings 24 and 26 are radially interposed between the shaft 10 and the body 20. These bearings 24 and 26 are arranged, respectively, in the area of a first axial end 20A of the hub body 20, turned towards the end piece 19 and in the area an axial end 20B opposite the hub body 20, turned towards the nut 14. A nut 18 retaining the ball bearing 24 is axially interposed between the end 20.1 of the hub body 20 and the end piece 19.

The hub body 20 comprises a central portion 20.2, bordered on both sides, along the axis X, by zones for anchoring the spokes, for example, for fastening the hub to the rim, such as spokes, for example. On the side opposite the freewheel, this anchoring zone is directly constituted by a flange 20.1, which extends radially from the hub body, and which receives the spokes. One the side of the freewheel, the anchoring zone is constituted by a portion 20.3 for receiving a second flange 20.4. The flange 20.1 and the portion 20.3 are integral, or one-piece, with the hub body 20. For example, the hub body 20 is manufactured by machining a block of metal.

The flange 20.4 is fixedly assembled to the hub body 20, for example via a friction fit. Thus, the flange 20.4 is rotationally and translationally affixed to the hub body 20. The central portion 20.2 and the flanges 20.1 and 20.4 are unitary, or more precisely are unitary after assembly. In other words, after assembly of the hub 2, the central portion 20.2 and the flanges 20.1 and 20.4 are rotationally and translationally connected, that is, there is no relative movement between the flanges and the central portion of the hub body 20. The spoke set 4b is assembled to the flange 20.4 and connects the rim 3 to the flange 20.4. The spoke set 4a is assembled to the flange 20.1 and connects the rim 3 to the flange 20.1.

Each flange 20.1 and 20.4 comprises means for fastening the spokes, for example grooves 23 provided for housing the ends of the spokes.

Figure 5:
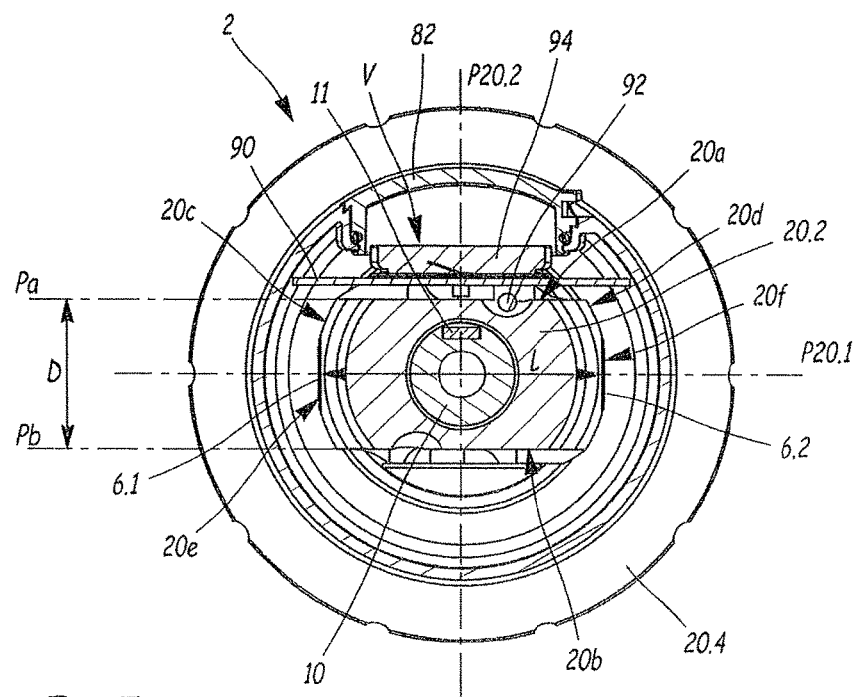
FIG. 5 is a transverse cross section along the plane P5 of FIG. 3 (also a cross-section along the line V-V of FIG. 6)

The geometry of the central portion 20.2 of the hub 20 is generally that of a cylinder with a circular cross section truncated by two planes Pa and Pb parallel to one another and to the axis X, as is apparent from FIG. 5. The central portion 20.2 of the hub body 20 is generally symmetrical in relation to two median planes P20.1 and P20.2 which are mutually perpendicular and pass through the axis X. The plane P20.1 is parallel to the planes Pa and Pb and is located between these planes. Thus, the measurement performed by the strain gauge bridge is independent of the bending moments and of the normal force.

The cross section of the central portion 20.2 of the hub 20 is generally rectangular and comprises two large flat surfaces 20a and 20b which are defined by the planes Pa and Pb and form the large sized sides of the rectangular cross section.

The small sized sides of the rectangular cross section are formed by two slightly convex surfaces 20c and 20d of the central portion 20.2 of the hub body 20. The surfaces 20c and 20d each comprise a small flat surface 20e and 20f on which the strain gauges 6.1 and 6.2 are glued.

The distance D between the large flat surfaces 20a and 20b, that is to say the length of the small sized sides of the rectangular cross section, is strictly less than the maximum width L of the transverse cross section of the central portion 20.2 of the hub 20, measured between the surfaces 20c and 20d.

The hub body 20 comprises a portion 20.5 for receiving a freewheel body 40, which extends the anchoring portion 20.3 on the side of the nut 14.

A lip seal 5 is axially interposed between the freewheel body 40 and the driving flange 20.4 to prevent external dirt from entering the hub 2.

A ring 21 is arranged around the end 20B of the hub body 20 and projects beyond the end 20B, on the side of the nut 14. The ring 21 forms a housing for receiving a ball bearing 22 radially interposed between the shaft 10 and the ring 21. A washer 23 axially separates the bearings 22 and 26.

The freewheel body 40 is affixed to the ring 21 and is mounted around the hub body 20 and the ring 21. A plain bearing 25 is radially interposed between the hub body 20 and freewheel body 40. A shaft collar 42 blocks the freewheel body 40 on the side of the nut 14. The shaft collar 42 has an external thread which cooperates with an internal thread provided within the freewheel body 40. The nut 14 and the shaft collar 42 axially retain the bearings 22 and 26 and the ring 21.

The freewheel body 40 is provided with internal teeth 41, and the hub body 20 is provided with pawls 45, one of which is visible in FIG. 2, adapted to interact with the internal teeth 41 of the freewheel body 40, in order to selectively affixed the body 20 and body 40 when the hub 2 is in a so-called pedaling configuration, in which the freewheel body 40 is driving in relation to the hub body 20, because the cyclist exerts a force for rotationally driving the freewheel body 40, via a chain not shown. The pawls 45 enable a unidirectional rotation of the hub body 20 in relation to the freewheel body 40 and do not oppose the rotation of the wheel when the cyclist stops pedaling.

The freewheel body 40 is provided with outer ribs 44 forming reliefs for rotationally affixing the freewheel body 40 with a sprocket cassette 46 shown in FIG. 6, in broken line, by the trace of its envelope. The sprocket cassette 46 is engaged with the chain of the bicycle.

A power-measuring system 60 is integrated into the hub 2. The system 60 comprises strain gauges 6.1 and 6.2 fixed to the surfaces 20c and 20d, respectively, of the central portion 20.2 of the hub 2 by gluing, for example. The gauges 6.1 and 6.2 are centered on the plane P20.1.

Advantageously, but not necessarily, the gauges having a high gauge coefficient or factor are selected in order to obtain a signal of greater amplitude, and thus to improve the sensitivity of the power-measuring system 60.

In a known manner, the relative variation in the resistance of a strain gauge is proportional to the gauge factor and to the deformation or variation in the relative length of the gauge and, therefore, also to the deformation of the test body which supports the gauge. In this case, the test body is comprised of the central portion 20.2 of the hub body 20.

Figure 4:
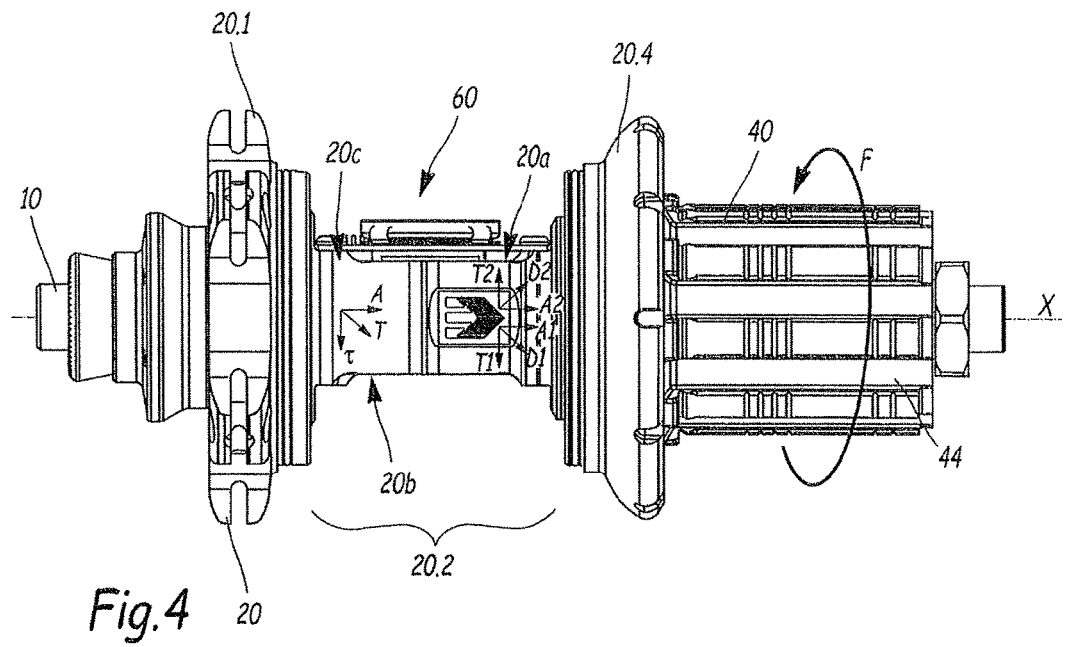
FIG. 4 is a view according to the arrow F4 of FIG. 3, in which a protective tube is not shown for clarity of the drawing.

The gauges 6.1 and 6.2 are double, meaning that they each make it possible to measure the deformation of the central portion 20.2 of the hub 20 along two nonparallel directions D1 and D2 shown in FIG. 4. Alternatively, each gauge 6.1 and 6.2 is replaced by two separate single strain gauges.

A protective tube 80 is axially arranged between the flanges 20.1 and 20.4. During assembly of the hub 2, the tube 80 is fitted around the central portion 20.2 of the hub body 20; then the flange 20.4 on the side of the freewheel is mounted on the hub body 20. A volume V for receiving the measuring system 60 is defined, along the axis X, between the flanges 20.1 and 20.4. Along a radial direction, the volume V is demarcated between the central portion 20.2 of the hub body 20 and the tube 80. The tube 80 is made for example from a synthetic material; its low rigidity does not contribute to the mechanical strength of the hub 2 or to the transmission of parasitic torque between the flanges 20.1 and 20.4.

The measuring system 60 includes a circuit board 90 that is housed in the volume V. The circuit board 90 is assembled on the flat surface 20a of the central portion 20.2 of the hub body 20, for example by means of screws. The circuit board 90 is equipped with a reed-type switch 92, shown in FIG. 5, for measuring the angular velocity of the hub 2 in relation to the shaft 10. The reed switch 92 detects each revolution of the hub 2, about the shaft 10, using a magnet 11 arranged in a notch provided in the shaft 10.

Moreover, the measuring system 60 is provided with an electric energy storage battery 94 which powers the gauges 6.1 and 6.2 and the measuring system. The battery 94 is assembled to the circuit board 90 using flexible metal lugs 93, or tabs, shown in FIG. 2. The tube 80 comprises a hatch 81 for access to the battery 94, blocked by a removable lid 82. Thus, the battery 94 can be easily removed and replaced when it is discharged.

The output signal of the gauges 6.1 and 6.2 is transmitted to the circuit board 90 by a wired connection, not shown. To limit power consumption, the gauges of 6.1 and 6.2 are powered in a pulsating manner, according to an embodiment of the invention, by energizing them for only a few tens of microseconds at a sampling frequency above 40 Hz The circuit board 90 is equipped with a transmitting antenna 95, shown in FIG. 6, that transmits a wireless signal related to the power measurement to an onboard computer that is fixable to the handlebar of the bicycle. For example, the signal is transmitted via Bluetooth or ANT+ radio waves, so as to be compatible with the commercially available onboard computers. In a particular embodiment, the tube 80 is made of a material, such as a synthetic material, in order not to disturb this signal.

When the cyclist pedals in a driving movement, the hub body 20 becomes slightly deformed in torsion, as shown by arrow T in FIG. 4. The torsion T comprises a circumferential component corresponding to a shear stress τ (tau) which is exerted at the surface of the hub body 20, in particular in the area of the surfaces 20c and 20d on which the strain gauges 6.2 and 6.1 are glued. The shear stress T induces two main deformation directions, the first angled at +45° and the second at −45°.

Thus, when the cyclist transmits a driving torque in the F direction, the gauge 6.1, whose grid is oriented along the direction D1, undergoes negative deformation (retraction), thereby causing a decrease in its ohmic resistance, or a negative resistance variation, whereas the gauge 6.1, whose grid is oriented along the direction D2, undergoes a positive deformation (elongation), thereby causing an increase in its electrical resistance, or a positive resistance variation. The same is true for the two gauges 6.2 D1 and 6.2 D2; these four resistive gauges are electrically assembled into a full Wheatstone bridge powered in a pulsated manner by the board 90, and the electrical imbalance of the bridge is then proportional to the torque transmitted by the cyclist. As seen above, the resistance of the gauges 6.1 D1 and 6.2 D1 decreases with the torque, while the resistance of the gauges 6.1 D2 and 6.2 D2 increases with the torque. Thus, the gauges varying in the same direction are assembled, opposite 2 by 2, in the Wheatstone bridge, thus forming a full bridge having 4 active gauges providing a maximum electrical signal.

The bridge signal is then amplified and then digitally converted by an A/D converter integrated in the measuring chain 60 integrated in the circuit board 90. The torque signal transmitted is determined by subtracting the calibration value corresponding to the bridge imbalance in the absence of torque; this calibration can be performed automatically at each freewheeling phase, as described in the patent document EP-0 391 756-B1 and family member U.S. Pat. No. 5,018,392-A.

A temperature compensation can be applied to this calibration offset to take into account any possible offset drift of the measuring chain between two automatic calibration values, which may be the case during long climbs to passes without any freewheeling phase, allowing no readjustment of the offset while the temperature may change significantly with altitude and weather conditions.

The torque value transmitted is finally deduced by multiplying the above torque signal by a calibration constant determined during the calibration phase performed on a complete wheel. This calibration constant can be temperature-corrected by applying a law of variation of the calibration coefficient as a function of the temperature; this law, in a particular embodiment, is determined for each sensor during the calibration phase, or it can simply be applied systematically to all of the sensors based on tests performed in laboratory. This correction of the calibration factor makes it possible to take into account the variation in modulus of elasticity of the test body with temperature, the variation of the gauge factor with temperature, and the possible gain drifts of the amplifiers of the circuit board 90. The axial components A1 and A2 of the gauges make it possible to measure the compression of the central portion of the hub body.

As explained in more detail below, the calibration takes into account the rigidities of the elements which make up the wheel 1.

The central portion 20.2 of the hub body 20 is dimensioned so that the deformation of the gauges 6.1 and 6.2 is limited, in order to enable the gauges of 6.1 and 6.2 to withstand the fatigue cyclic stresses.

When the cyclist pedals in a driving movement, the pawls 45 rotationally affix the freewheel body 40 to the hub body 20 and the hub body 20 is rotationally driven about the axis X. The driving torque passes between the flanges 20.1 and 20.4 via a first path passing through the spoke set 4b on the side of the freewheel and the rim 3, on the one hand, and via a second path passing through the central portion 20.2 of the hub body 20 and the spoke set 4a on the side opposite the freewheel, on the other hand. The distribution of the driving torque between the first path and the second path is calculated based on the torsional rigidities, expressed in Nm/degree, of the elements that make up the wheel 1, namely the hub body 20, the rim 3, the tire, and the spoke sets 4a and 4b. This torsional rigidity is particularly dependent on the angle formed by the spokes with a radial direction. In the example shown in the drawing figures, the spokes on the side of the freewheel are exactly radially oriented; the torque passing through the spoke set 4b on the side of the freewheel is equal to about 7% of the total driving torque of the wheel 1. In contrast, the torque passing through the hub and the spoke set 4a on the side opposite the freewheel is about 93% of the total driving torque.

In the invention, as the torque measurement is carried out directly on the hub body itself, it is not possible for the measurement to take into account the proportion of the torque which passes through the spoke set on the freewheel side. Therefore, the measuring system does not measure the total torque transmitted by the rear sprockets to the rim, but only a proportion thereof which is less than 99%, or, in a particular embodiment, less than 98%. Furthermore, in order for the measurement to be relevant, the wheel must be designed so that a non-negligible proportion of the torque passes through the hub body and the spoke set opposite the freewheel.

In particular embodiments, the wheel is designed so that the torque passing through the hub 2 ranges between 40% and 98% of the total driving torque of the wheel 1 and, in other embodiments, between 90% and 96%.

Given the orientation of the spokes of the sets 4a and 4b, the percentage of the driving torque passing through the spoke set 4b on the freewheel side is low, for example on the order of 6% of the driving torque. The friction fit assembly of the flange 20.4 on the freewheel side to the hub body 20 enables transmission by adherence of this low torque; bonding may also be suitable.

Figure 10:
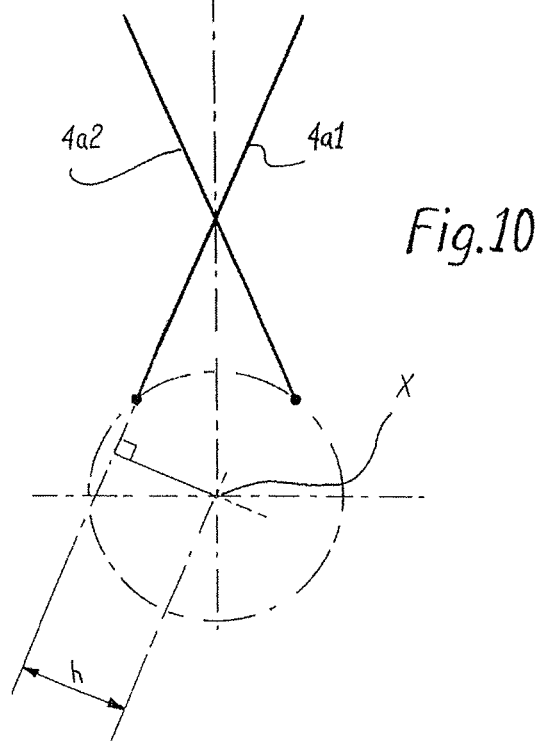
FIG. 10 is a schematic view showing the distance between the spokes and the wheel axis for the spoke set opposite the freewheel.

FIG. 10 schematically shows two of the criss-crossed spokes of the set opposite the freewheel of the wheel according to the first and second embodiments of the invention. The circle shown in broken lines represents the positioning circle of the spoke fasteners in relation to the axis X of the wheel. The distance h corresponds to the distance formed by the spoke and the axis. Generally, this distance h varies between 0, when the spokes are strictly radial, which is the case for the set 4b on the freewheel side, and a value corresponding to the radius of the positioning circle of the spoke fasteners, when the spokes are tangent.

In the two embodiments shown, the value h is zero for the set on the freewheel side, whereas it is 25.8 mm for the spokes of the set on the side opposite the freewheel. This configuration results in a proportion of the driving torque passing through the hub body and, therefore, measured by the measuring system, approximately equal to 93%.

Other configurations are possible without departing from the scope of the invention. In an alternative embodiment, not shown, the spokes of the set on the side of the freewheel are crossed by one, meaning that the spokes are uniformly distributed and once intersect two by two, whereas their fasteners in the area of the rim are evenly distributed, and that the set opposite the freewheel is crossed by two as on the wheel shown in FIG. 1. In this case, the value h for the spokes of the set on the side of the freewheel is substantially equal to 16 mm, whereas that of the spokes of the set opposite the freewheel is equal to 26 mm, or a ratio 16/26=61%. In this alternative embodiment, the proportion of the driving torque passing through the hub body and measured by the measuring system is equal to approximately 50%. In this case, the cross section of the hub body acting as a test body on which the gauges are glued must be scaled to achieve a good level of sensitivity of the sensor.

Generally, when the hub of the invention is used for a spoked wheel, the wheel is constructed so that the spokes on the freewheel side have a distance h from the wheel axis which is less than 16 mm, and the spokes of the set opposite the freewheel have a distance h from the axis greater than 15 mm, and a ratio between these two dimensions is less than 65%. Thus, one ensures that the proportion of the transmitted torque passing through the set on the side opposite the freewheel and, therefore, through the central portion of the hub body, is satisfactory to perform the measurement thereof, and the calculation by extrapolation of the total torque transmitted to the rim.

The circuit board 90 calculates the driving power of the wheel 1 by multiplying the angular velocity of the hub 2 by the measurement of the driving torque provided by the gauges 6.1 and 6.2. In other words, by being equipped with the reed switch 92, the hub 2 constitutes a system for measuring the driving power of the wheel 1.

When the wheel 1 is subject to a lateral force, the hub body 20 becomes slightly deformed in bending. These bending deformations are not related to the driving torque supplied by the cyclist. Therefore, they tend to disturb the measurements. The gauges 6.1 and 6.2 are angularly offset by 180° in relation to the axis X. Moreover, the central portion 20.2 of the hub body 20 is symmetrical with respect to the planes P20.1 and P20.2. This geometry makes it possible to symmetrize the bending deformations and tends to cancel their measurement, given the Wheatstone bridge configuration.

Similarly, the hub body may be subject to an axial force but the geometrical symmetries associated with the symmetry of the Wheatstone bridge make it possible to yield an independent measurement of the parasitic axial force.

Advantageously, when the wheel 1 is freewheeling, the offset of the gauges 6.1 and 6.2 is set to zero in order to cancel the imbalance of the Wheatstone bridge that is due to the differences in resistance of its gauges 6.1 and 6.2, and also to cancel the imbalances of the entire signal amplification and processing chain.

The measuring system 60 automatically detects the freewheeling phases by analyzing the instantaneous variations in torque. Indeed, during a pedaling cycle, the torque transmitted by the cyclist passes through two maxima, corresponding to the positions in which the right and left pedal cranks form a 60° angle with the vertical, and two minima, when one of the cranks is in the low position. The measurement of the torque provided by the gauges 6.1 and 6.2 detects these modulations. When there is no more modulation, the measuring system 60 concludes that the cycle is freewheeling. It can then proceed to the offset.

In a step prior to using the cycle, the measuring system 60 is calibrated to obtain a relationship between the output signals of the gauges 6.1 and 6.2 and the driving torque provided by the cyclist when pedaling. During this calibration, the wheel 1 is mounted, meaning that it comprises the hub 2, the central axis 10, the spoke sets 4a and 4b, the rim, and the tire. The tire is inflated to its operating pressure, in order to best approximate the mechanical behavior of the wheel 1 during use. A torque generator is assembled to the hub 2 and rotationally drives it, whereas the rim 3 is immobilized. The calibration involves performing a series of tests in which the driving torque supplied by the torque generator is varied, by raising the output signals of the gauges 6.1 and 6.2. To account for possible hysteresis, a calibration can be performed by increasing the torque, and then by decreasing it in order to take this possible hysteresis into account.

This calibration makes it possible to take into account the overall rigidity of the wheel 1, in particular the rigidity of the spoke sets 4a and 4b, and may be performed for each wheel 1 according to the invention when leaving the factory. Thus, the invention is not limited to a particular type of spoking. The wheel 1 comprised criss-crossed spokes 4a1 and 4a2 forming the spoke set 4a opposite the freewheel, and radial spokes forming the spoke set 4b on the side of freewheel. However, in the context of the invention, the spokes can be assembled differently, insofar as the calibration takes into account the rigidity of spoke set.

Optionally, the measuring system 60 is equipped with a temperature sensor, for example attached to the hub body 20. The Young's modulus of the elements making up the wheel 1 is influenced by the temperature variations and has an impact on the rigidity of the elements, and therefore also on the driving torque measured. The temperature variation thus influences the tension of the spokes, as well as the gauge factor and the gain of the amplifier of the measuring chain 60.

The temperature measurement enables the circuit board 90 to compensate for the temperature variations. For this it is necessary during calibration to conduct tests in which the variations of the driving torque are measured as a function of the temperature. In the following relationship: $C = K \cdot \Delta E / E \cdot f(\theta)$. C is the driving torque, K is the stiffness constant of the wheel 1, ΔE/E is the relative tension variation measured by the Wheatstone bridge comprised of the four gauges 6.1 D1/6.1 D2/6.2 D1/6.2 D2, and f(θ) is the law of correction as a function of the temperature θ. For example, the law f(θ) is a polynomial of the fourth degree.

The hub 2 is lightweight and inexpensive because the hub body 20 is substantially unitary. With respect to the measurement of the torque, the hub body does not incorporate any additional mechanical parts that would be useful only for the measurement of torque, and in particular no mechanical parts that, in an assembled configuration of the hub body, are movable in relation to another, thereby improving its reliability and the precision of the torque and power measurement. The only additional part is not actually a mechanical part because it is the circuit board. Moreover, it is not necessary to provide an additional part to attach the strain gauges 6.1 and 6.2 because they are fixed directly to the hub body 20. Finally, it is not necessary to incorporate a ball bearing or a bearing to isolate the test body from the sensor in rotation; it is the very structure of the spoked wheel that fulfills this function.

In another embodiment, the hub 2 is not equipped with the member 92 for measuring the angular velocity of the hub 2. In this case, the hub is not a power-measuring system but only a torque-measuring hub. However, such a torque-measuring hub makes it is possible to obtain a measurement of the driving power of the wheel by determining its angular velocity using suitable device which, for example, is positioned on another wheel of the cycle, or via GPS measurement. In this case, the cycle can be equipped with a calculation module, integrated for example in the on-board computer, to calculate the power from the torque measurement provided by the hub 2, and from the angular velocity measurement.

Figure 7:
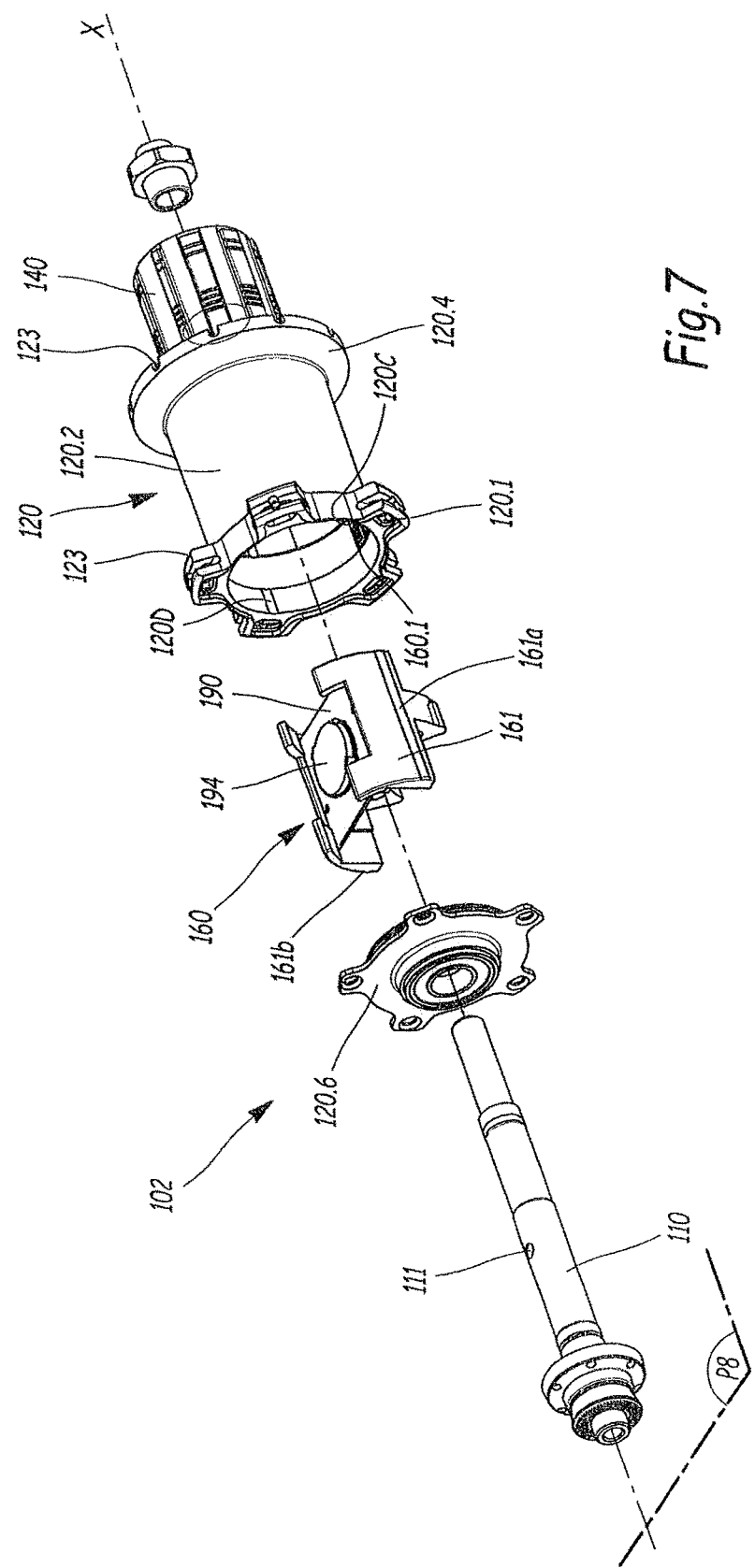
FIG. 7 is an exploded perspective view of a torque-measuring hub according to a second embodiment of the invention.
Figure 8:
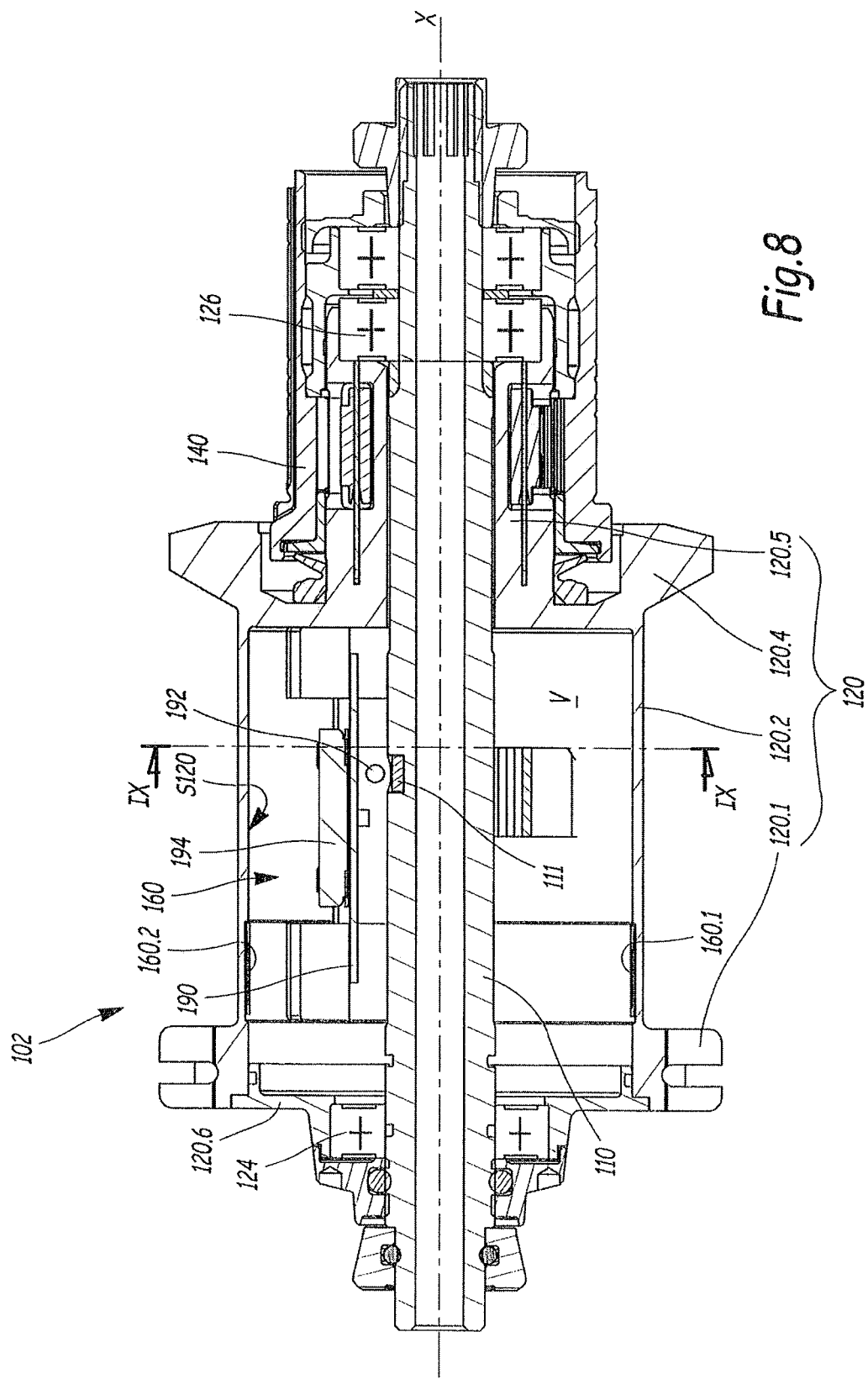
FIG. 8 is an axial cross section of the hub of FIG. 7, along the plane P8 of FIG. 7.
Figure 9:
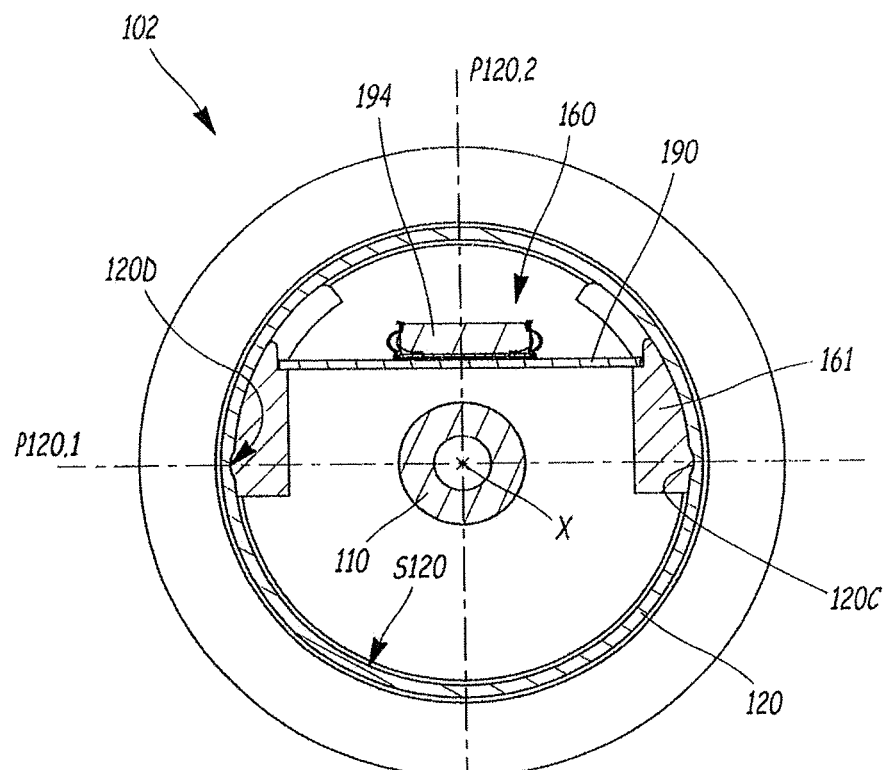
FIG. 9 is a transverse cross section along the line IX-IX of FIG. 8.

FIGS. 7-9 show a hub 102 according to a second embodiment of the invention in which the elements similar to those of the hub 2 have the same reference numerals, increased by 100. The hub 102 is adapted to be mounted on a cycle wheel such as the wheel 1.

The hub 102 differs from the hub 2 by the geometry of its hub body 120. Hereinafter, the elements of the hub 102 similar to those of the hub 2 are not described in detail.

The hub body 120 extends about a hollow shaft 110 itself extending along an axis X. The hub body 120 includes a tubular and hollow central portion 120.2, demarcated on both sides by a flange 120.1 or 120.4. Unlike the hub 2, the two flanges 120.1 and 120.2 of the hub body 120 are integral with the central portion 120.2, that is to say, they are made in one-piece with the central portion 120.2, for example by machining a material block. Each flange 120.1 and 120.2 comprises a structure 123 for fastening the spokes.

Two ball bearings 124 and 126 are radially interposed between the hollow shaft 110 and the hub body 120. On the side of the flange 120.1, a lid 120.6 closes an inner volume V demarcated within the central portion 120.2 of the hub body 120. The lid 120.6 is assembled to the hub body 120 using screws 120 which cooperate with the flange 120.1.

The hub body 120 comprises a portion 120.5 for receiving a freewheel body 140. The portion 120.5 extends the flange 120.4, opposite the other flange 120.1.

A system 160 for measuring the power of the wheel 1 is housed in the volume V. The measuring system 160 comprises a support 161 made from a synthetic material. The outer shape of the support 161 is generally cylindrical and has two longitudinal ribs 161a and 161b cooperating with two rails 120C and 120D provided in the inner surface of the central portion 120.2 of the hub body 120, so as to block the rotation of the support 161 in relation to the hub body 120. The support 161 is removable. The disassembly of the lid 120.6 by loosening the five screws (not shown) provides access to the inner volume V.

The second embodiment makes it possible, for example, to provide wheels that are pre-fitted with gauges and without the electronic adaptation kit, which can be offered as an option and subsequently integrated by disassembling the shaft 110, the lid 120.6, by connecting the circuit board 190 to the pre-installed gauges, inserting the measuring system 160 in the hub body, closing the lid 120.6, and reassembling the shaft 110. The installation of the electronic kit can be carried out without completely dismounting the wheel. In this version, it is advantageous to have performed a first initial calibration of the Wheatstone bridge and to integrate an electronic component capable of memorizing its calibration factor; thus, the calibration of the sensor is recognized automatically during initialization of the measuring system.

The second embodiment also provides simple, robust, and waterproof access to the battery compartment. For this, it suffices to disassemble the shaft 110 and to open the lid 120.6 to access the battery.

The support 161 supports a circuit board 190 which supports a reed switch 192 and a battery 194. The hollow shaft 110 comprises a magnet 111 detected by the reed switch 192.

Two pairs of strain gauges 106.1 and 106.2, visible in FIG. 8, are fixed to the inner surface S120 of the central portion 120.2 of the hub body 120, in the vicinity of the flange 120.1.

The hub body 120 has a generally rotational symmetry about the axis X. In particular, the central portion 120.2 is symmetrical in relation to two planes P120.1 and P120.2 passing through the axis X and perpendicular to one another. The plane P120.2 passes through the gauges 106.1 and 106.2. The gauges 106.1 and 106.2 are angularly offset by 180° in relation to the axis X.

The hollow shape of the central portion 120.2 of the hub body 120 provides it with greater stiffness and lighter weight.

The operation of the hub 102 for measuring the torque and driving power of the wheel is similar to the operation of the hub 2.

The invention has been described with reference to a bicycle wheel 1, but it also applies to all cycle wheels.

Moreover, the various embodiments and alternative embodiments described above may be combined, partially or totally, to give rise to other embodiments of the invention.

At least because the invention is disclosed herein in a manner that enables one to make and use it, by virtue of the disclosure of particular exemplary embodiments of the invention, the invention can be practiced in the absence of any additional element or additional structure that is not specifically disclosed herein.

The invention claimed is:

1. A hub for measuring the driving torque of a cycle wheel, comprising:
   a central shaft defining an axis of rotation of the cycle wheel;
   a hub body mounted to rotate freely about the shaft, the hub body comprising:
   a central portion;
   an anchoring structure on each of opposite axial sides of the central portion, said anchoring structures configured for fastening at least one connecting element connecting the hub body to a rim of the cycle wheel;

each of the anchoring structures being fixed against movement in relation to the central portion of the hub body;

a measuring system for measuring the driving torque of the wheel, said system including strain gauges fixed on the hub body.

2. A hub according to claim 1, wherein:

the system for measuring the driving torque is configured to measure only a proportion of the driving torque, said proportion ranging between 40% and 98%.

3. A hub according to claim 1, wherein:

the strain gauges are fastened to the central portion of the hub body.

4. A hub according to claim 1, wherein:

each of the two anchoring structures is comprised of a respective flange extending radially from the hub body.

5. A hub according to claim 1, wherein:

the central portion of the hub body has a generally symmetrical transverse cross section in relation to two longitudinal perpendicular planes.

6. A hub according to claim 1, wherein:

at least two strain gauges are angularly offset by 180° in relation to the axis.

7. A hub according to claim 1, wherein:

the central portion of the hub body has a generally rectangular transverse cross section.

8. A hub according to claim 7, wherein:

two of the strain gauges are fixed to small sized surfaces of the central portion of the hub body.

9. A hub according to claim 4, further comprising:

a tubular protective element arranged between the flanges around the central portion of the hub body and demarcating a volume for receiving the measuring system.

10. A hub according to claim 1, wherein:

the central portion of the hub body is hollow and demarcates a volume for receiving the measuring system.

11. A hub according to claim 10, wherein:

the strain gauges are fastened to the inner surface of the central portion of the hub body.

12. A hub according to claim 1, wherein:

the hub body, in an assembled configuration, comprises no portion movable in relation to another portion.

13. A system for measuring the driving power of a cycle wheel, the system comprising:

a hub for measuring the driving torque of a cycle wheel, the hub comprising:

a central shaft defining an axis of rotation of the cycle wheel;

a hub body mounted to rotate freely about the shaft, the hub body comprising:

a central portion;

an anchoring structure on each of opposite axial sides of the central portion, said anchoring structures configured for fastening at least one connecting element connecting the hub body to a rim of the cycle wheel;

each of the anchoring structures being fixed against movement in relation to the central portion of the hub body;

a measuring system for measuring the driving torque of the wheel, said system including strain gauges fixed on the hub body; and a member for measuring angular velocity of the hub body in relation to the central shaft.

14. A cycle wheel comprising a hub according to claim 1.

15. A cycle wheel comprising a system according to claim 13.

16. A method of measuring using a hub of a wheel of a cycle according to claim 1, said method comprises:

calibrating, prior to using the cycle, by means of a series of tests are carried out using a torque generator driving the hub, with the rim immobilized, in order to obtain a relationship between output signals of the strain gauges and the driving torque of the wheel.

17. A method according to claim 16, wherein:

prior to and during calibrating, the hub and the rim are connected together and an inflated tire is mounted on the rim.

18. A method according to claim 16 using a hub equipped with a temperature sensor, further comprising:

during calibrating, carrying out a series of tests in order to establish a relationship between temperature variations and driving torque of the wheel.

19. A method of measuring using a system according to claim 13, said method comprises:

calibrating, prior to using the cycle, by means of a series of tests are carried out using a torque generator driving the hub, with the rim immobilized, in order to obtain a relationship between output signals of the strain gauges and the driving torque of the wheel.

20. A method according to claim 19, wherein:

prior to and during calibrating, the hub and the rim are connected together and an inflated tire is mounted on the rim.

21. A method according to claim 19 using a hub equipped with a temperature sensor, further comprising:

during calibrating, carrying out a series of tests in order to establish a relationship between temperature variations and driving torque of the wheel.

* * * * *